(12) United States Patent
Winfield Mote

(10) Patent No.: US 12,360,831 B2
(45) Date of Patent: Jul. 15, 2025

(54) JOB COUNT GENERATION AND MANAGEMENT

(71) Applicant: Twilio Inc., San Francisco, CA (US)

(72) Inventor: Tyson Winfield Mote, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 24 days.

(21) Appl. No.: 18/195,798

(22) Filed: May 10, 2023

(65) Prior Publication Data

US 2024/0160507 A1 May 16, 2024

Related U.S. Application Data

(60) Provisional application No. 63/418,373, filed on Oct. 21, 2022.

(51) Int. Cl.
| | |
|---|---|
| *G06F 9/54* | (2006.01) |
| *G06F 11/07* | (2006.01) |
| *G06F 11/14* | (2006.01) |
| *G06F 16/23* | (2019.01) |
| *G06F 16/25* | (2019.01) |
| *G06F 16/27* | (2019.01) |

(52) U.S. Cl.
CPC .......... *G06F 9/546* (2013.01); *G06F 11/0745* (2013.01); *G06F 11/1474* (2013.01); *G06F 16/2358* (2019.01); *G06F 16/258* (2019.01); *G06F 16/278* (2019.01)

(58) Field of Classification Search
CPC ...... G06F 9/542; G06F 9/546; G06F 11/0745; G06F 11/1438; G06F 11/1471; G06F 11/1474; G06F 11/3006; G06F 11/3476; G06F 16/182; G06F 16/22; G06F 16/24568; G06F 16/27
USPC ..................................... 714/18, 20
See application file for complete search history.

(56) References Cited

U.S. PATENT DOCUMENTS

| | | | | |
|---|---|---|---|---|
| 12,130,834 | B1 * | 10/2024 | Dimitriev | ............. G06F 3/0643 |
| 2003/0061225 | A1 | 3/2003 | Bowman et al. | |
| 2021/0248613 | A1 * | 8/2021 | Zhou | ................. G06Q 20/3276 |
| 2022/0229841 | A1 | 7/2022 | Kharidehal et al. | |
| 2023/0153287 | A1 | 5/2023 | Stephens et al. | |
| 2024/0134882 | A1 | 4/2024 | Mote | |

OTHER PUBLICATIONS

Aung et al., "CIMLA: Checkpoint Interval Message Logging Algorithm in Kafka Pipeline Architecture," 2020 International Conference on Advanced Information Technologies (ICAIT), Yangon, Myanmar, pp. 30-35 (Year: 2020).*

(Continued)

*Primary Examiner* — Michael Maskulinski
(74) *Attorney, Agent, or Firm* — Schwegman Lundberg & Woessner, P.A.

(57) ABSTRACT

Various embodiments include systems, methods, and non-transitory computer-readable media for managing data. Consistent with these embodiments, a method includes receiving a message that includes a delivery status of an event; generating a value of a count accumulator based on the receiving of the message; transmitting the message to a storage unit; identifying an offset that corresponds to the message; and writing, in a single transaction, the offset and the value of the count accumulator in a report database.

20 Claims, 7 Drawing Sheets

(56) References Cited

OTHER PUBLICATIONS

Kreps et al. "Kafka: A distributed messaging system for log processing." Proceedings of the NetDB. vol. 11. No. 2011 (Year: 2011).*

"U.S. Appl. No. 18/195,773, Non Final Office Action mailed Jul. 5, 2024", 10 pgs.

"U.S. Appl. No. 18/195,773, Examiner Interview Summary mailed Sep. 19, 2024", 2 pgs.

"U.S. Appl. No. 18/195,773, Response filed Oct. 7, 2024 to Non Final Office Action mailed Jul. 5, 2024", 8 pgs.

* cited by examiner

JOB COUNT GENERATION AND MANAGEMENT

TECHNICAL FIELD

The present disclosure generally relates to the technical field of data management, and, in one specific example, to systems, methods, techniques, instruction sequences, and/or devices for job count generation and management.

BACKGROUND

Systems face challenges when it comes to generating and managing job counts to ensure efficient data delivery to various destinations. Inefficient data tracking and management can cause various issues, including system latency in data processing and/or unnecessary consumption of computing resources.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
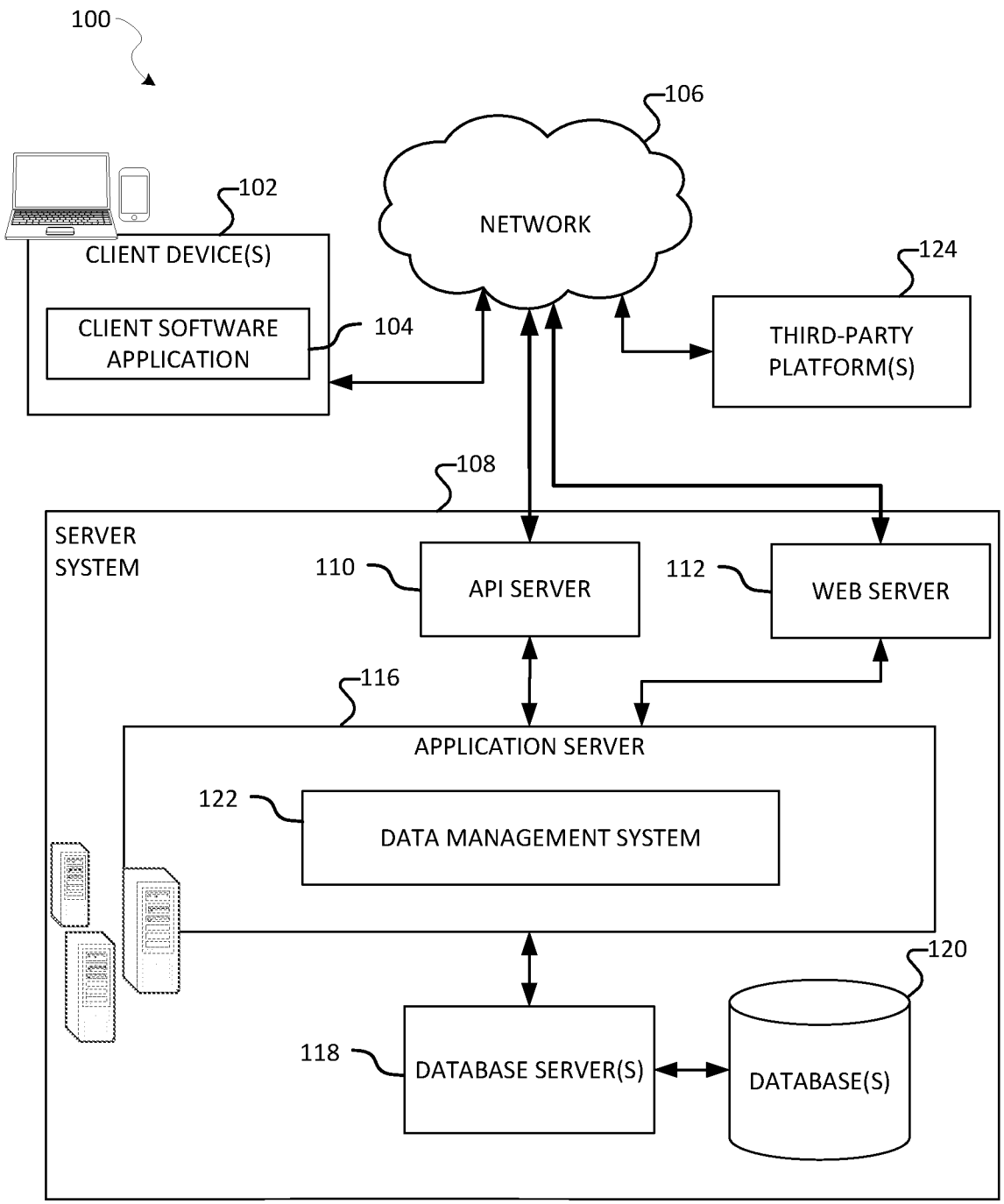
FIG. 1 is a block diagram showing an example networked environment that includes a data management system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

"Data warehouse" refers to a database that contains data that can be exploited using various tools. A data warehouse can be hosted in a customer's computing environment.

"Data model" refers to a query (e.g., a user-written SQL query) that defines data from a data warehouse that a user requests. An example user request includes requests to deliver data from the data warehouse to various destinations. A data model can run on a user-configured schedule and can be manually triggered.

"Sync" or "synchronization" refers to a data extracting and/or loading operation for a data model. It encompasses loading data from a data warehouse and delivering it to one or more configured destinations. A sync or synchronization is complete after all jobs have been successfully delivered or have been determined to be permanently failed.

"Phase" refers to a step (e.g., extract or load) in a synchronization. A phase in a given sync can run in series or parallel.

Various examples include systems, methods, and non-transitory computer-readable media for data management that facilitate generating and managing job counts to ensure efficient data delivery to various destinations. Specifically, a data management system receives one or more messages. Each message may include a delivery status of a corresponding event. Events (also referred to as jobs) may be generated based on one or more files. Each file can include one or more rows in a data record. A job (or an event) can be generated based on a row in a given file. A data record can include one or more SQL query results extracted from one or more data warehouses.

In various embodiments, the data management system generates a value of a count accumulator based on the receiving of the one or more messages. The value of the count accumulator represents the number of received messages to be reported. An example delivery status of an event can be a "success" delivery status or a "failure" delivery status. A "failure" delivery status can be determined if the delivery of an event was retried up to a threshold number of times (e.g., five times) or over a threshold period of time (e.g., 10 minutes).

In various embodiments, the data management system transmits the one or more messages to a storage unit. A storage unit can be hosted in an external system that distributes data in the storage unit among a plurality of clusters. The data management system identifies an offset that corresponds to the message. The offset represents the position of the message in the storage unit. Maintaining a record of the offsets can help identify where the last received message (or the batch of messages) is stored.

In various embodiments, the data management system writes, in a single transaction, both the updated offset and the updated value of the count accumulator in a report database. A single transaction can include a sequence of operations performed on a database, such as a report database described herein. The sequence of operations serves as a single logical unit of work that succeeds or fails as a whole. Writing the offset and the value of the count accumulator (also referred to as job count) in a single transition ensures exactly-once processing, such that the offset always matches the job count in the report database. Under this approach, the data management system is able to use the retrieved offset and job count to recover from an interrupt, such as a system crash, restart, or network failure, with minimal risks of losing or duplicating data, thereby reducing system latency.

In various embodiments, the data management system updates the offset and increments the job count as new messages are received. The data management system periodically writes the updated offset and incremented job count to the report database in a single transaction.

In various embodiments, the data management system retrieves the offset and the job count (e.g., the value of the count accumulator) from the report database when a network failure is detected. The data management system recovers from the failure based on the retrieved offset and the job count.

In various embodiments, an offset includes an identifier that is assigned to a storage unit in which a message is stored. The one or more messages described herein can be received via a Hypertext Transfer Protocol (HTTP) Application Programming Interface (API).

In various embodiments, failed event delivery can be retried. The count and interval between retries can be configured to balance reliability, latency, and cost efficiency.

In various embodiments, visibility of job generation and delivery can be composed of two main factors: counts and errors. Counts (also referred to as job counts) allow the data management system keeps track of the count of successful and permanently failed jobs in a sync. Reaching failed+ succeeded # of input jobs is the trigger that marks a sync as complete. Therefore, it's important that these counts are as accurate as humanly possible. Additionally, these counts should be low-latency because they are user-visible. Similar to an "Event Delivery" dashboard, the data management system can display (or cause display of) a sampling of errors for each sync, grouped by code. The data management system can leverage a visibility "events" API for storing and retrieving events via system visibility.

In various embodiments, job counts can be tracked. Consuming traces may not be the optimal approach because mapping individual spans back to their parent job is tricky and expensive, and it tightly couples the visibility logic with the upstream job (e.g., GX job) structure. Further, the system pipeline would need to implement a user for the entire traces firehose just to find the system-related spans. In contrast, according to various embodiments disclosed herein, the data management system can generate an example graph as below:

```
[cloudevents/deliver]
  |
  +-- else -> [http/deliver] Increment failure count
  |
  +-- then -> [http/deliver] Increment successful count
```

The data management system can configure an HTTP API (counts-ingest) that receives messages and transmits them to one or more storage units (e.g., Kafka topics) before returning a number that represents "OK" to a job processing engine. A user (e.g., a Kafka user) (counts-accumulator) of a storage unit described herein can consume these messages, accumulates counts, and periodically flushes them to a sync report database that ensures exactly-once processing and minimizes latency (e.g., error handling omitted). An example implementation is illustrated below.

```
tx, _ := s.conn.Begin(ctx)
defer tx.Rollback(ctx) // unless committed explicitly
// Avoid deadlock on counts table.
tx.Exec(ctx, 'LOCK TABLE counts IN SHARE UPDATE EXCLUSIVE MODE')
for key, count := range batch.counts {
   tx.Exec (ctx, '
      INSERT INTO counts (report_id, flow, phase, status, count)
         VALUES ($1, $2, $3, $4, $5)
         ON CONFLICT (report_id, flow, phase, status) DO
UPDATE SET count = counts.count + EXCLUDED.count
   ', key.reportID, key.flow, key.phase, key.status, count)
}
tx.Exec(ctx, '
   INSERT INTO counts_offsets (topic, partition_, offset_)
      VALUES ($1, $2, $3)
      ON CONFLICT (topic, partition_) DO UPDATE SET offset_ = EXCLUDED.offset_
', s.topic, s.partition, batch.offset)
return tx.Commit(ctx)
```

An API (e.g., an HTTP API) can accept the raw payload but encodes information about the count in the headers (e.g., the HTTP headers). The header can include various metadata, such as retl-report-id, retl-flow, retl-phase, retl-status, and retl-count.

Retl-report-id refers to an identifier of a report that includes a count.

Retl-flow refers to a flow (e.g., destination, model, source IDs) associated with the count.

Retl-phase refers to a phase associated with the count.

Retl-status refers to a status to increment (e.g., "load:failure," "load:success," etc.)

Retl-count refers to an amount to increment. Retl-count can be hard-coded to a value of 1.

In various embodiments, in response to receiving an API request, a response can be returned. The response can include a header that includes the encoded metadata described above.

In various embodiments, during event synchronization, when the system crashes, data may be lost. When the system recovers and retries the synchronization, data may be duplicated if the system does not keep track of the syncing progress.

The data management system can keep track of each row in a given file and asynchronously updates the count in a database in a given period of time, such as every second. In case of failure, the system can determine where to restart the syncing process (e.g., a position in a given file) by looking up the count in the database.

Reference will now be made in detail to embodiments of the present disclosure, examples of which are illustrated in the appended drawings. The present disclosure may, however, be embodied in many different forms and should not be construed as being limited to the embodiments set forth herein. Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example networked environment 100 that includes a data management system 122, according to various embodiments of the present disclosure. By including the data management system 122, the networked environment 100 can facilitate generating and managing job counts in high throughput and multifaceted networked environment as described herein. As shown, the networked environment 100 includes one or more client devices 102, a server system 108, and a network 106 (e.g., including Internet, wide-area-network (WAN), local-area-network (LAN), wireless network, etc.) that are communicatively coupled together. Each client device 102 can host a number of applications, including a client software application 104. The client software application 104 can communicate data with the server system 108 via a network 106. Accordingly, the client software application 104 can communicate and exchange data with the server system 108 via the network 106.

The server system 108 provides server-side functionality via the network 106 to the client software application 104. While certain functions of the networked environment 100 are described herein as being performed by the data management system 122 on the server system 108, it will be appreciated that the location of certain functionality within the server system 108 is a design choice. For example, it may be technically preferable to initially deploy certain technology and functionality within the server system 108, but later migrate this technology and functionality to the client software application 104.

With respect to server system 108, each Application Program Interface (API) server 110 and web server 112 is coupled to an application server 116, which hosts the data management system 122. The application server 116 is communicatively coupled to a database server 113, which facilitates access to a database 120 that stores data associated with the application server 116, including data that may be generated or used by the data management system 122, in various embodiments.

The API server 110 receives and transmits data (e.g., API calls, commands, requests, responses, and authentication data) between the client device 102 and the application server 116, and between the one or more services and the application server 116. Specifically, the API server 110 provides a set of interfaces (e.g., endpoint, routines, or protocols) that can be called or queried by the client software application 104 or the one or more services in order to invoke the functionalities of the application server 116. The API server 110 exposes various functions supported by the application server 116, including without limitation: user registration; login functionality; data object operations (e.g., extraction, generating, storing, retrieving, encrypting, decrypting, transferring, access rights, licensing, etc.), and user communications.

Through one or more web-based interfaces (e.g., web-based user interfaces), the web server 112 can support various functions of the data management system 122 of the application server 116. In various embodiments, the deployment or implementation of the web server 112 and the application server 116 may share the same set of executable code. In various embodiments, the web server 112 may be a subsystem or a component of the application server 116.

The application server 116 hosts a number of applications and subsystems, including the data management system 122, which supports various functions and services with respect to various embodiments described herein. The application server 116 is communicatively coupled to a database server 113, which facilitates access to database(s) 120 that stores data associated with the data management system 122.

Figure 2:
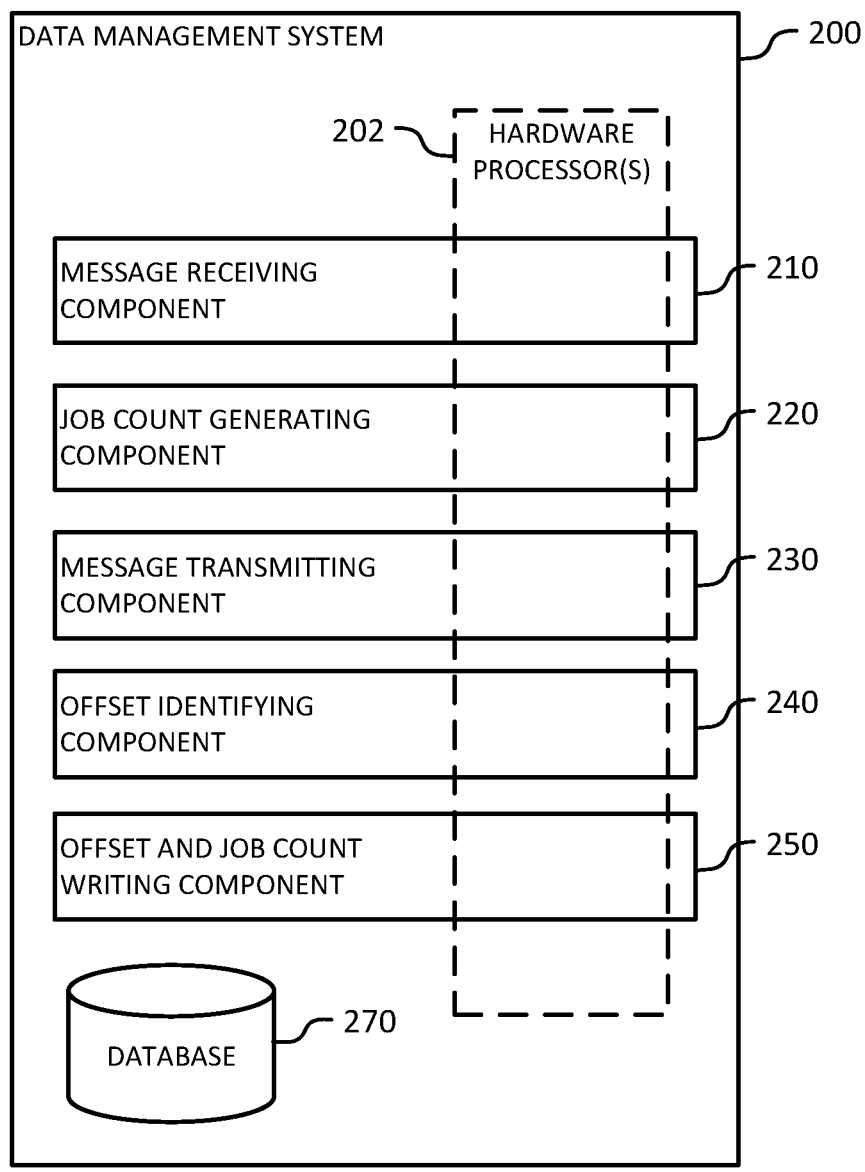
FIG. 2 is a block diagram illustrating an example data management system, according to various embodiments of the present disclosure.

FIG. 2 is a block diagram illustrating an example data management system 200, according to various embodiments of the present disclosure. For some embodiments, the data management system 200 represents an example of the data management system 122 described with respect to FIG. 1. As shown, the data management system 200 comprises a message receiving component 210, a job count generating component 220, a message transmitting component 230, an offset identifying component 240, and an offset and job count writing component 250. According to various embodiments, one or more of the message receiving component 210, the job count generating component 220, the message transmitting component 230, the offset identifying component 240, and the offset and job count writing component 250 are implemented by one or more hardware processors 202.

In various embodiments, the message receiving component 210 is configured to receive one or more messages. Each message may include a delivery status of a corresponding event. An event can be generated based on a row in a data record that is to be delivered to a configured destination. A data record can include one or more SQL query results extracted from one or more data warehouses.

In various embodiments, the job count generating component 220 is configured to generate a value of a count accumulator (also referred to as job count) based on the receiving of the one or more messages. The value of the count accumulator represents the number of received messages to be reported.

In various embodiments, the message transmitting component 230 is configured to transmit the one or more messages to a storage unit. A storage unit can be hosted in an external system that distributes data in the storage unit among a plurality of clusters.

In various embodiments, the offset identifying component 240 is configured to identify an offset that corresponds to the message. The offset represents the position of the message in the storage unit. Maintaining a record of the offsets can help identify where the last received message (or the batch of messages) is stored.

In various embodiments, the offset and job count writing component 250 is configured to write, in a single transaction, both the updated offset and the updated value of the count accumulator in a report database. A single transaction can include a sequence of operations performed on a database, such as a report database described herein. The sequence of operations serves as a single logical unit of work that succeeds or fails as a whole. Writing the offset and the value of the count accumulator (also referred to as job count) in a single transition ensures exactly-once processing, such that the offset and the job count maintained in the report database always match.

Figure 3:
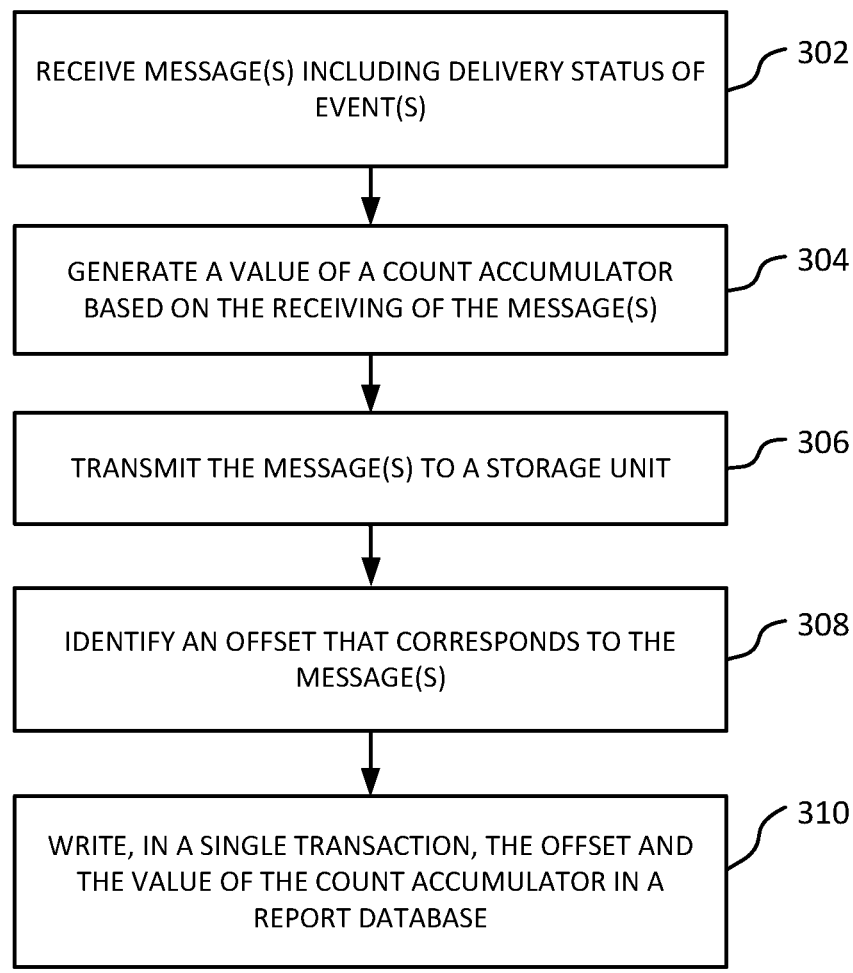
FIG. 3 is a flowchart illustrating an example method for generating and managing job counts, according to various embodiments of the present disclosure.

FIG. 3 is a flowchart illustrating an example method for generating and managing job counts, according to various embodiments of the present disclosure. It will be understood that example methods described herein may be performed by a machine in accordance with some embodiments. For example, the method 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may al so be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor receives one or more messages. Each message may include a delivery status of a corresponding event. Events (also referred to as jobs) may be generated based on one or more files. Each file can include one or more rows in a data record. A job (or an event) can be generated based on a row in a given file. A data record can include one or more SQL query results extracted from one or more data warehouses.

At operation 304, a processor generates a value of a count accumulator based on the receiving of the one or more messages. The value of the count accumulator represents the number of received messages to be reported. An example delivery status of an event can be a "success" delivery status or a "failure" delivery status. A "failure" delivery status can be determined if the delivery of an event was retried up to a threshold number of times (e.g., five times) or over a threshold period of time (e.g., 10 minutes).

At operation 306, a processor transmits the one or more messages to a storage unit. A storage unit can be hosted in an external system that distributes data in the storage unit among a plurality of clusters.

At operation 308, a processor identifies an offset that corresponds to the message. The offset represents the position of the message in the storage unit. Maintaining a record of the offsets can help identify where the last received message (or the batch of messages) is stored.

At operation 310, a processor writes, in a single transaction, both the updated offset and the updated value of the count accumulator in a report database. A single transaction can include a sequence of operations performed on a database, such as a report database described herein. The sequence of operations serves as a single logical unit of work that succeeds or fails as a whole. Writing the offset and the value of the count accumulator (also referred to as job count) in a single transition ensures exactly-once processing, such that the offset always matches the job count in the report database. Under this approach, the data management system is able to use the retrieved offset and job count to recover from an interrupt, such as a system crash, restart, or network failure, without losing or duplicating data, thereby reducing system latency.

Figure 4:
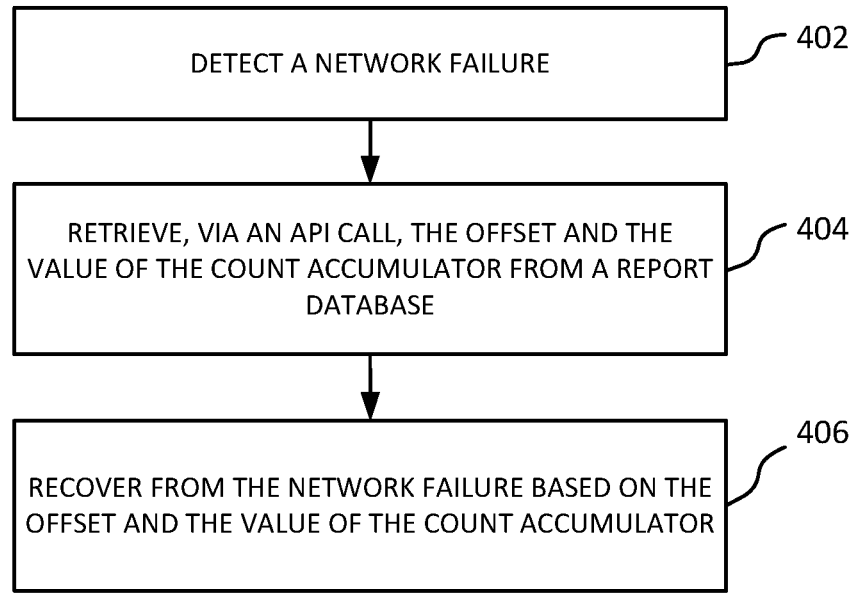
FIG. 4 is a flowchart illustrating an example method for generating and managing job counts, according to various embodiments of the present disclosure.

FIG. 4 is a flowchart illustrating an example method for generating and managing job counts, according to various embodiments of the present disclosure. It will be understood that example methods described herein may be performed by a machine in accordance with some embodiments. For example, the method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of method 400 may be a sub-routine of one or more of the operations of method 300. In various embodiments, one or more operations in method 400 may be performed subsequent to the operations of method 300.

At operation 402, a processor detects an interrupt, such as a system crash, restart, or network failure.

At operation 404, a processor retrieves an offset and a job count (e.g., the value of the count accumulator) from a report database.

At operation 406, a processor recovers from the interrupt (e.g., network failure) based on the retrieved offset and the job count.

In various embodiments, the processor can generate a report based on a history of the offsets and job counts written in the report database.

Figure 5:
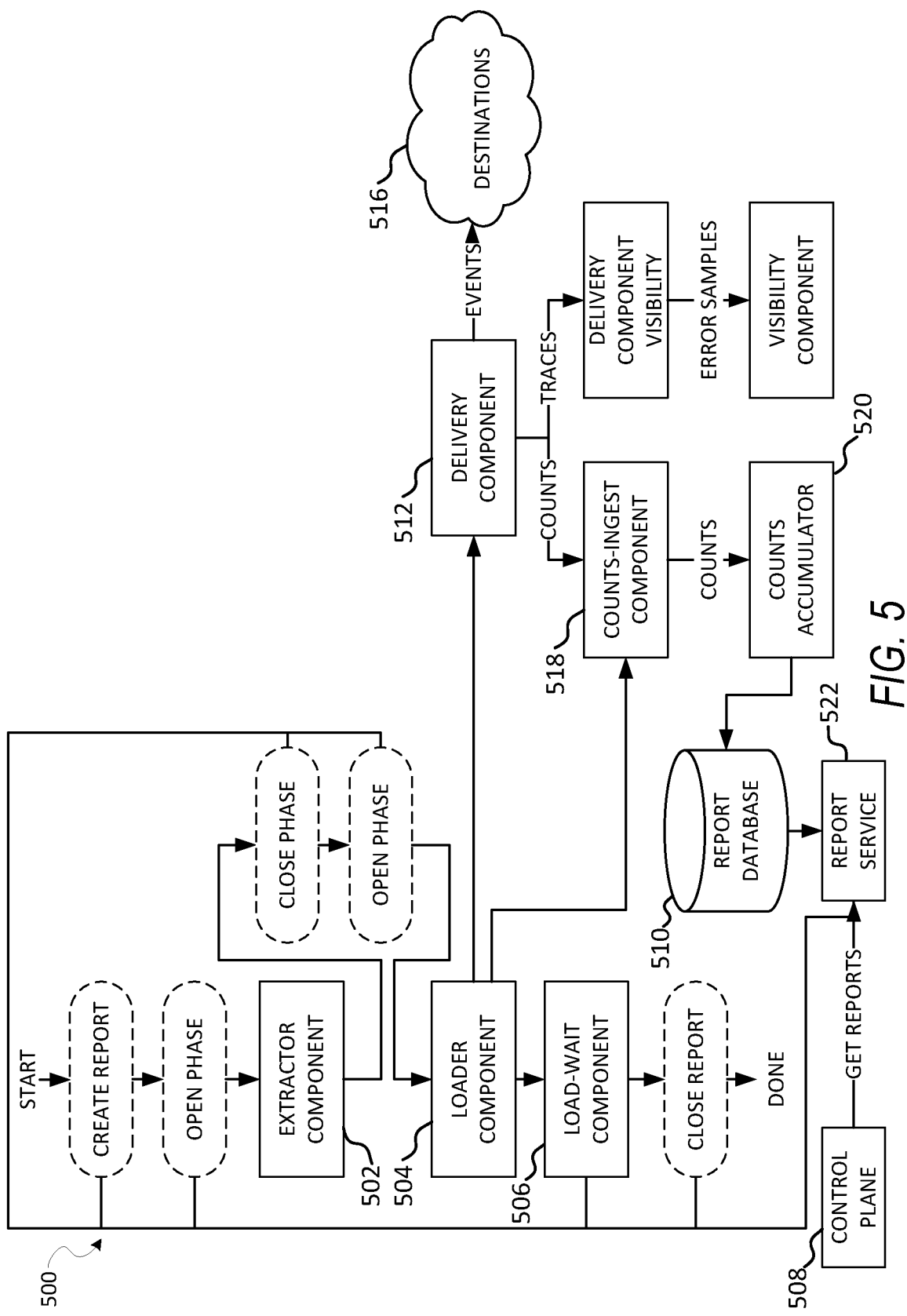
FIG. 5 is a block diagram illustrating an example networked computing architecture that includes an example data management system, according to various embodiments of the present disclosure.

FIG. 5 is a block diagram illustrating an example networked computing architecture 500 that includes an example data management system, according to various embodiments of the present disclosure. The example networked computing architecture 500 includes the data management system 122 described with respect to FIG. 1, the data management system 200 described with respect to FIG. 2, or individual components thereof. As illustrated, the example networked computing architecture 500 may be a cloud computing environment that hosts the data management system (e.g., system 122, system 200) to perform various functionality described herein. The example data management system can include all or one or more of the components described herein.

As shown, user inputs can be received via control plane 508. Example user inputs can include metadata, action configurations, action mappings, etc. A user (or a customer) can request reports from report service 522 via the control plane 508. Extractor component 502 generates query results from various data warehouse (not shown) and store the query results in one or more intermediate object storage (not shown). Loader component 504 generates jobs (also referred to as events) based on the query results for delivery component 512. The delivery component 512 delivers the jobs to various destinations 516. In essence, customers can use one or more data warehouses as a source, periodically pull data (via queries) from the one or more data warehouses, and cause the queried data (e.g., query results) to be delivered to one or more configured destinations (also referred to as action destinations).

Load-wait component 506 can determine when the expected job count matches the reported job count. When the value of the expected job count and the value of the reported job count are even, the data management system can close the report, as illustrated in FIG. 5. In various embodiments, expected job count can be determined based on the number of jobs that are generated. The reported job count (also referred to as actual job count) can be determined based on the sum of reported jobs with "success" delivery status and "failure" delivery status.

Counts-ingest component 518 can include an HTTP API described herein. The HTTP API receives messages and transmits them to one or more storage units (e.g., Kafka topics) before returning a number that represents "OK" to a job processing engine (not shown). A storage unit (e.g., Kafka topic) consumer can consume these messages, accumulates counts (via counts accumulator 520), and periodically flushes them to a sync report database (e.g., report database 510) that ensures exactly-once processing and minimizes latency (e.g., error handling omitted).

Figure 6:
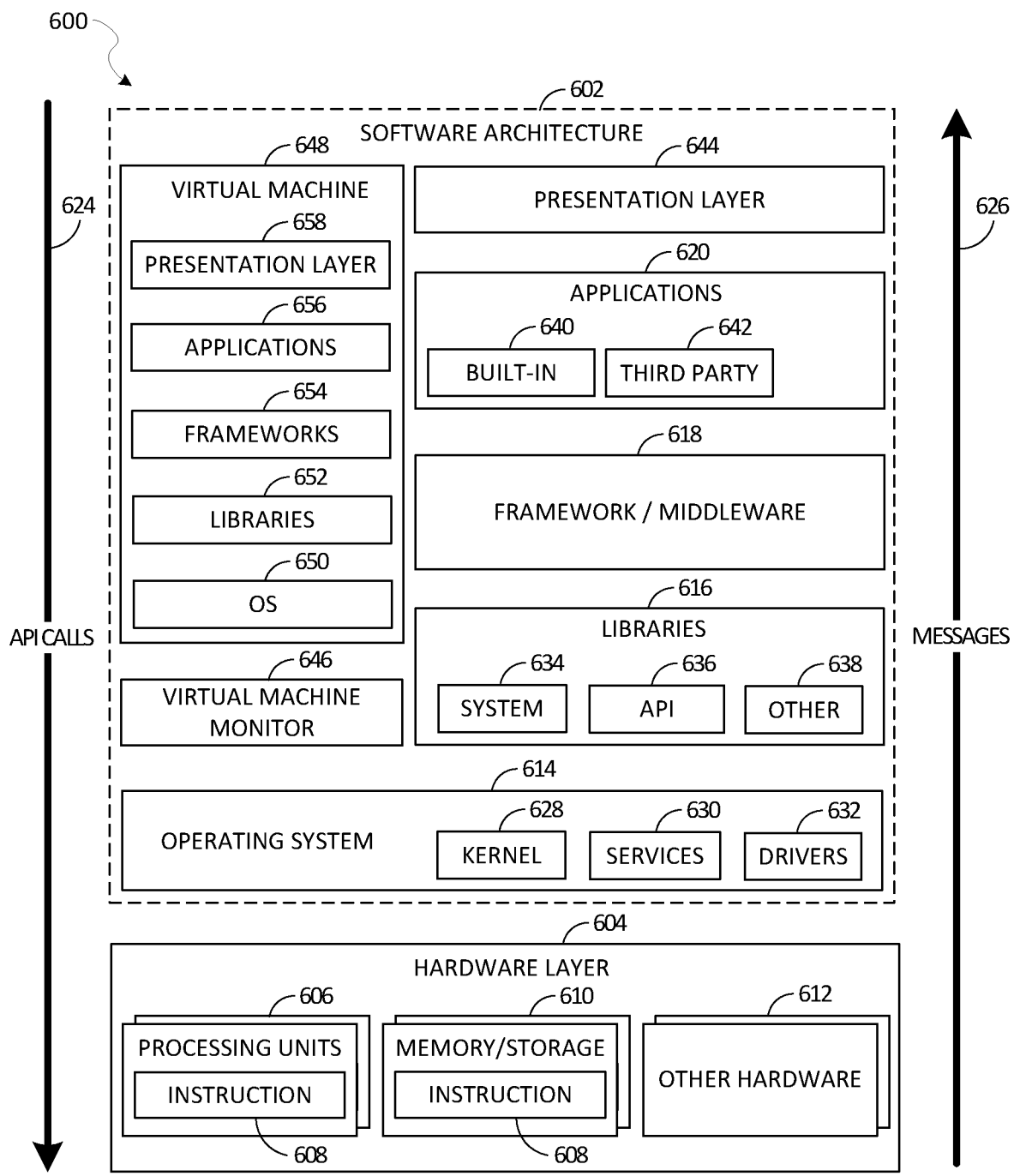
FIG. 6 is a block diagram illustrating a representative software architecture, which may be used in conjunction with various hardware architectures herein described, according to various embodiments of the present disclosure.

FIG. 6 is a block diagram illustrating an example of a software architecture 602 that may be installed on a machine, according to some example embodiments. FIG. 6 is merely a non-limiting example of software architecture, and it will be appreciated that many other architectures may be implemented to facilitate the functionality described herein. The software architecture 602 may be executing on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 comprises one or more processing units 606 having associated executable instructions 608. The executable instructions 608 represent the executable instructions of the software architecture 602. The hardware layer 604 also includes memory or storage modules 610, which also have the executable instructions 608. The hardware layer 604 may also comprise other hardware 612, which represents any other hardware of the hardware layer 604, such as the other hardware illustrated as part of the machine 600.

In the example architecture of FIG. 6, the software architecture 602 may be conceptualized as a stack of layers, where each layer provides particular functionality. For example, the software architecture 602 may include layers such as an operating system 614, libraries 616, frameworks/middleware 613, applications 620, and a presentation layer 644. Operationally, the applications 620 or other components within the layers may invoke API calls 624 through the software stack and receive a response, returned values, and so forth (illustrated as messages 626) in response to the API calls 624. The layers illustrated are representative in nature, and not all software architectures have all layers. For example, some mobile or special-purpose operating systems may not provide a frameworks/middleware 613 layer, while others may provide such a layer. Other software architectures may include additional or different layers.

The operating system 614 may manage hardware resources and provide common services. The operating system 614 may include, for example, a kernel 623, services 630, and drivers 632. The kernel 623 may act as an abstraction layer between the hardware and the other software layers. For example, the kernel 623 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than by interfacing directly with the underlying operating system 614 functionality (e.g., kernel 623, services 630, or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 633 to provide many other APIs to the applications 620 and other software components/modules.

The frameworks 613 (also sometimes referred to as middleware) may provide a higher-level common infrastructure that may be utilized by the applications 620 or other software components/modules. For example, the frameworks 613 may provide various graphical user interface functions, high-level resource management, high-level location services, and so forth. The frameworks 613 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a home application, a contacts application, a browser application, a book reader application, a location application, a media application, a messaging application, or a game application.

The third-party applications 642 may include any of the built-in applications 640, as well as a broad assortment of other applications. In a specific example, the third-party applications 642 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 642 may invoke the API calls 624 provided by the mobile operating system such as the operating system 614 to facilitate functionality described herein.

The applications 620 may utilize built-in operating system functions (e.g., kernel 623, services 630, or drivers 632), libraries (e.g., system libraries 634, API libraries 636, and other libraries 633), or frameworks/middleware 613 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with the user.

Some software architectures utilize virtual machines. In the example of FIG. 6, this is illustrated by a virtual machine 643. The virtual machine 643 creates a software environment where applications/modules can execute as if they were executing on a hardware machine (e.g., machine 700 of FIG. 7). The virtual machine 643 is hosted by a host operating system (e.g., the operating system 614) and typically, although not always, has a virtual machine monitor 646, which manages the operation of the virtual machine 643 as well as the interface with the host operating system (e.g., the operating system 614). A software architecture executes within the virtual machine 643, such as an operating system 650, libraries 652, frameworks/middleware 654, applications 656, or a presentation layer 653. These layers of software architecture executing within the virtual machine 643 can be the same as corresponding layers previously described or may be different.

Figure 7:
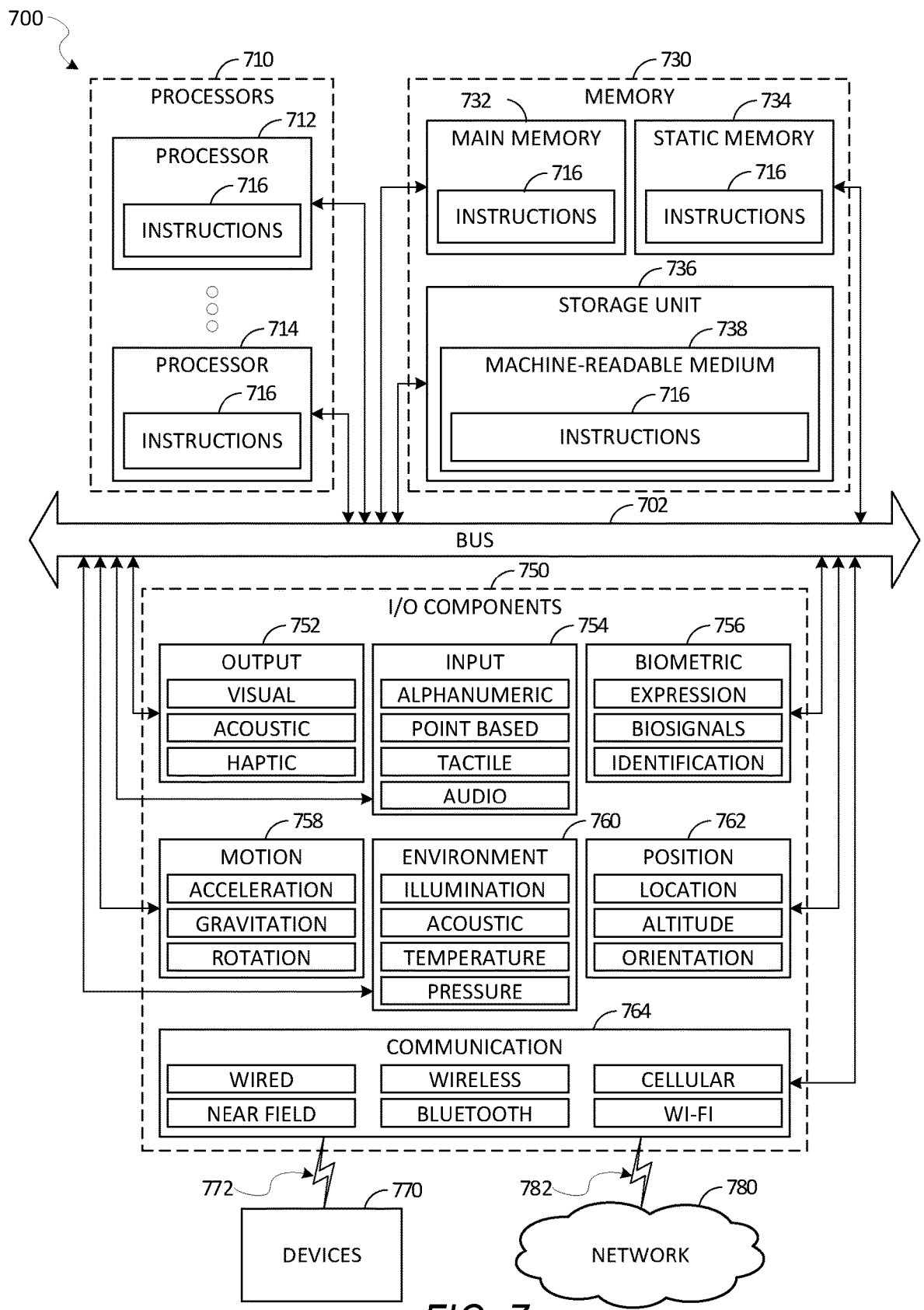
FIG. 7 is a block diagram illustrating components of a machine able to read instructions from a machine storage medium and perform any one or more of the methodologies discussed herein according to various embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method 300 described above with respect to FIG. 3, and the method 700 described above with respect to FIG. 7. Instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an embodiment, the processors 710 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory 730 may include a main memory 732, a static memory 734, and a storage unit 736 including machine-readable medium 733, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 750 may include biometric components 756, motion components 753, environmental components 760, or position components 762, among a wide array of other components. The motion components 753 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 730 or devices 770 via a coupling 732 and a coupling 772, respectively. For example, the communication components 764 may include a network interface component or another suitable device to interface with the network 730. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 730, 732, 734, and/or the memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 730 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 730 or a portion of the network 730 may include a wireless or cellular network, and the coupling 732 may be a Code Division Multiple Access (CDMA) connection, a Global System for Mobile communications (GSM) connection, or another type of cellular or wireless coupling. In this example, the coupling 732 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
receiving a message that includes a delivery status of an event;
generating a value of a count accumulator based on the receiving of the message, the value of the count accumulator representing a number of received messages to be reported;
transmitting the message to a storage unit;
identifying an offset that corresponds to the message, the offset representing a position of the message in the storage unit; and
writing, in a single transaction, the offset and the value of the count accumulator in a report database.

2. The method of claim 1, further comprising:
receiving a further message that includes a delivery status of a further event;
updating the value of the count accumulator based on the receiving of the further message;
transmitting the further message to the storage unit, the further message corresponding to a further offset that represents a position of the further message in the storage unit; and
writing, in a single transaction, the further offset and the updated value of the count accumulator in the report database.

3. The method of claim 2, further comprising:
detecting a network failure;
retrieving, via an API call, the further offset and the updated value of the count accumulator from the report database; and
recovering from the network failure based on the further offset and the updated value of the count accumulator.

4. The method of claim 1, wherein the further offset and the updated value of the count accumulator are encoded in an HTTP header.

5. The method of claim 1, wherein the storage unit is hosted in an external system that distributes data in the storage unit among a plurality of clusters.

6. The method of claim 1, wherein the offset comprises an identifier assigned to the storage unit in which the message is stored.

7. The method of claim 1, wherein the message is received via a Hypertext Transfer Protocol (HTTP) Application Programming Interface (API).

8. The method of claim 1, wherein the single transaction comprises a sequence of operations performed on the report database, the sequence of operations serving as a single logical unit of work that succeeds or fails as a whole.

9. The method of claim 1, wherein the report database is a SQL database.

10. The method of claim 1, wherein the delivery status of the event comprises one of a success delivery status and a failure delivery status.

11. A system comprising:
at least one memory storing instructions; and
one or more hardware processors communicatively coupled to the at least one memory and configured by the instructions to perform operations comprising:
receiving a message that includes a delivery status of an event;
generating a value of a count accumulator based on the receiving of the message, the value of the count accumulator representing a number of received messages to be reported;
transmitting the message to a storage unit;
identifying an offset that corresponds to the message, the offset representing a position of the message in the storage unit; and
writing, in a single transaction, the offset and the value of the count accumulator in a report database.

12. The system of claim 11, wherein the operations further comprise:
receiving a further message that includes a delivery status of a further event;
updating the value of the count accumulator based on the receiving of the further message;
transmitting the further message to the storage unit, the further message corresponding to a further offset that represents a position of the further message in the storage unit; and
writing, in a single transaction, the further offset and the updated value of the count accumulator in the report database.

13. The system of claim 12, wherein the operations further comprise:
detecting a network failure;
retrieving, via an API call, the further offset and the updated value of the count accumulator from the report database; and
recovering from the network failure based on the further offset and the updated value of the count accumulator.

14. The system of claim 11, wherein the further offset and the updated value of the count accumulator are encoded in an HTTP header.

15. The system of claim 11, wherein the storage unit is hosted in an external system that distributes data in the storage unit among a plurality of clusters.

16. The system of claim 11, wherein the offset comprises an identifier assigned to the storage unit in which the message is stored.

17. The system of claim 11, wherein the message is received via a Hypertext Transfer Protocol (HTTP) Application Programming Interface (API).

18. The system of claim 11, wherein the single transaction comprises a sequence of operations performed on the report database, the sequence of operations serving as a single logical unit of work that succeeds or fails as a whole.

19. The system of claim 11, wherein the report database is a SQL database.

20. A non-transitory computer-readable medium comprising instructions that, when executed by a hardware processor of a device, cause the device to perform operations comprising:
receiving a message that includes a delivery status of an event;
generating a value of a count accumulator based on the receiving of the message, the value of the count accumulator representing a number of received messages to be reported;
transmitting the message to a storage unit;

identifying an offset that corresponds to the message, the offset representing a position of the message in the storage unit; and writing, in a single transaction, the offset and the value of the count accumulator in a report database.

\* \* \* \* \*